United States Patent [19]

Binder et al.

[11] Patent Number: 4,732,114
[45] Date of Patent: Mar. 22, 1988

[54] PROCESS FOR PRODUCING A DIESEL-FUEL/WATER EMULSION FOR A DIESEL ENGINE

[75] Inventors: Klaus Binder, Deizisau; Gerd Seidel, Aichwald, both of Fed. Rep. of Germany

[73] Assignee: Daimler-Benz Aktiengesellschaft, Stuttgart, Fed. Rep. of Germany

[21] Appl. No.: 881,925

[22] Filed: Jul. 3, 1986

[51] Int. Cl.⁴ .................................... F02M 25/02
[52] U.S. Cl. ............................ 123/25 E; 123/1 A
[58] Field of Search .................. 123/25 E, 25 F, 1 A

[56] References Cited

U.S. PATENT DOCUMENTS

| | | | |
|---|---|---|---|
| 3,749,097 | 7/1973 | Grow | 123/25 E X |
| 3,921,599 | 11/1975 | Grow | 123/25 E X |
| 4,273,078 | 6/1981 | Cottell | 123/25 E X |
| 4,412,512 | 11/1983 | Cottell | 123/25 E |
| 4,463,708 | 8/1984 | Gerry | 123/25 E |

Primary Examiner—Tony M. Argenbright
Attorney, Agent, or Firm—Barnes & Thornburg

[57] ABSTRACT

A process is described for producing a diesel fuel/water emulsion for a diesel engine in which, as a function of the operating condition of the engine, water and diesel fuel are mixed at different quantitative proportions and supplied to the engine. The water and the diesel fuel separately are led practically to the intake side of the injection pump and are mixed only in the pump cylinder. The non-injected highly pressurized excess quantity of fuel is stored temporarily in an accumulator and is again supplied to the injection pump during the next intake stroke. The process makes it possible to produce a very fine water/fuel mixture and in addition to keep the volume of the fnished water/fuel mixture low, so that when the quantitative proportion is changed because of the inertia of the system, the new fuel/water mixture is available at the point of consumption (injection nozzle).

15 Claims, 2 Drawing Figures

PROCESS FOR PRODUCING A DIESEL-FUEL/WATER EMULSION FOR A DIESEL ENGINE

BACKGROUND AND SUMMARY OF THE INVENTION

This invention relates to a process of producing a diesel fuel/water emulsion for the operation of diesel engines which, in addition to a reduction of soot formation and more favorable exhaust gas emission values (less $NO_x$), results in an interior cooling of the engine and thus in lower exhaust gas temperatures with improved efficiency. In this case, it was found that it is most advantageous for the engine to be operated by varying the water content in the fuel as a function of engine parameters, such as load, speed, engine temperature, etc., rather than using a constant fuel/water ratio.

A process is shown in German Patent DE-OS No. 32 37 305 in which an injection arrangement is described. In this arrangement, separate injection system is provided that has its own injection pump for the water to be admixed, in addition to the actual diesel fuel injection system. The former system leads into the diesel fuel injection system between the diesel fuel injection pump and the pertaining injection valve. For the proportioning of the water quantity to be admixed, an electronic control system is provided that takes into account the exhaust gas temperature, the fuel consumption and/or the speed. The disadvantage in the case of this system is mainly that for the admixing of the water, an additional expensive high-pressure injection pump must be provided. A further disadvantage is that water and diesel fuel are brought in contact with one another in the high-pressure part of the injection system, which does not result in an especially intimate mixing of water and fuel. However, an especially fine and intimate mixing of water and fuel is especially advantageous for the combustion process.

An object of this invention is to improve the initially described admixing proces to the extent that an improved mixing of the fuel and the water is achieved. A further object of the invention is to provide a fuel/water mixing process which requires only one injection pump.

The objects of the present invention are achieved by providing a process of producing a diesel fuel/water emulsion for a diesel engine which includes supplying quantities of water and diesel fuel separately to the intake side of an injection pump. The quantities of diesel fuel and water are then mixed in a cylinder of the injection pump. By means of the intake stroke of the injection pump, an especially good mixing and swirling-together of diesel fuel and water will take place.

According to another advantageous embodiment of the invention, an emulsifying agent may be added to the diesel fuel or the water in a way that is known per se. The emulsifying agent supports the formation of the emulsion and contributes to the stabilizing of the formed emulsion. Factors determining whether and in what amount such an addition of the emulsifying agent is necessary include the size of the engine, the quality of the diesel fuel used, the length of the lines from the injection pump to the injection nozzle, etc. The advantages of the addition of an emulsifying agent in an individual case should be determined by experimentation.

It is known that diesel injection pumps operate with a constant piston stroke. In previous injection pumps, the part of the displacement not required, i.e., the excess amount of fuel in the case of conventional diesel engines, is returned into the fuel system in front of the pump.

According to another advantageous embodiment of the invention, this conventional return does not take place, and the excess amount of fuel is stored temporarily in an accumulator and is then added to the injection pump during the next intake stroke.

In an advantageous embodiment of the invention, the accumulator is preferably operated at a pressure that is higher than the pressure in the water and diesel fuel feeding systems following pumping, but lower than the pressure that is required for the opening of the pump check valve on the high-pressure side or of the injection nozzle valve. In this way, the emulsion stored in the accumulator is preferably taken into the injection pump cylinder during the intake stroke. Furthermore, during the intake stroke, fuel is prevented from flowing from the accumulator, past check valve 3 into the engine which would be noticed at the injection nozzle as "after-dripping".

The production of different amounts of water and diesel fuel can take place in many ways. However, it is preferable to keep the fuel and the water in the lines leading to the injection pump under constant pressure and to adjust the quantitative proportion of water to fuel by means of controlled screen openings (control valves). Another very simple, and therefore also preferred, solution is to produce the quantitative proportions by means of timed flow valves. In these cases, the quantity control is a result of the ratio of the times in which the valve is opened or closed.

The different quantities of water and diesel fuel are led separately to the intake side of the injection pump. In this case, it is possible to equip the injection pump with two intake openings for water and diesel fuel. It is also possible to use only one intake opening and to lead the fuel and the water flow together directly in front of this opening. By means of the swirling-together during the intake stroke, a very good formation of the emulsion is obtained. The water part in the injected mixture may be between 0 (cold start) and up to about 30 percent by volume. The quantitative proportions, that are adjusted by a conventional electronic control system by means of engine operating parameters, depend on the purpose that is to be achieved with the admixture of water. These purposes include, for example, saving as much diesel fuel as possible, achieving the most favorable exhaust gas emission values, or maintaining the highest possible engine performance. These parameters must be determined by the constructor of the engine by means of his technical knowledge.

The invention is described in detail in the following and in the figures by means of two embodiments in a diagrammatic representation.

Figure 1:
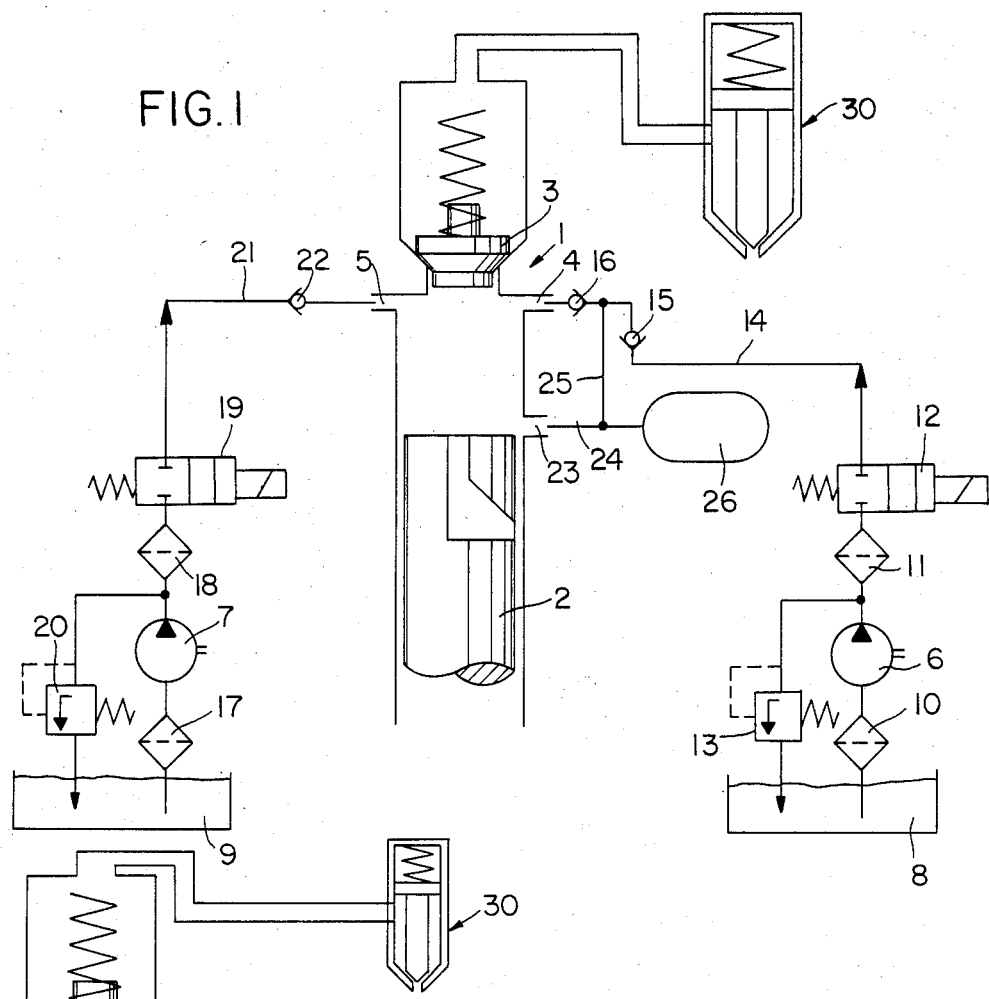
FIG. 1 is an injection pump with two separate supply openings for water and diesel fuel.

FIG. 1 shows an injection pump 1 with the plunger 2 as well as the check valve 3 that prevents the flowing back of fuel from the pipes leading to the injection nozzles 30. The pump is also equipped with two inflow openings 4 and 5 for the supply of diesel fuel and water. By means of the pump 6, diesel fuel is taken in from the diesel fuel tank 8 through the filter 10 and pressed through the filter 11 to the magnetic valve 12. To maintain a constant pressure in front of the filter 11, a pressure limiting valve 13 is arranged between the pump 6 and the filter 11 that lets a corresponding part of the fuel delivered by the pump, flow back into the tank 8 when there is excessive pressure. After flowing through the magnetic valve 12, the fuel flows through the pipe 14 to the inflow opening 4 of the injection pump. The pipe 14 is also equipped with check valves 15 and 16 that prevent pressurized fuel pressed from the pump from flowing back into the pipe 14. On the other side of the pump, the water tank 9 is shown. The pump 7, via the filter 17, takes water out of the tank 9 and presses it via the filter 18 to the magnetic valve 19. Also in this case, the pressure in front of the filter 18 is kept constant by the insertion of a pressure-limiting valve 20 between the pump and the filter 18. From the magnetic valve 19, the water flows through the pipe 21 to the inflow opening 5 of the pump. A flowing-back of pressurized fuel emulsion into the water pipe is prevented by the check valve 22. The magnetic valves 12 and 19 are controlled by an electronic system (not shown) such that water and fuel are supplied corresponding to their desired proportion with respect to one another during the intake stroke of the plunger 2. During the injection stroke of the plunger 2, the excess plunger content (excess quantity) flows through the opening 23 and the pipe 24 into the accumulator 26.

The accumulator 26 is designed in such a way that the exces quantity stored in it is pressurized by means of a pressure that is lower than the pressure required for the opening of the check valve 3 or of the injection nozzle valve. Further, the pressure is higher than the pressure in the fuel supply system which is adjusted by means of the pressure limiting means 13 and 20. The pipe 24 leading to the accumulator 26 is also equipped with a pipe 25 that leads into the fuel pipe 14 between the check valves 15 and 16. The check valve 15 prevents the pressurized excess quantity from flowing back from the accumulator 26 into the fuel tank 8. During the injection stroke, as soon as the plunger 2 has moved beyond the opening 23, the fuel injection into the engine takes place. The check valves 16 and 22 prevent the discharge of fuel or fuel emulsion into the pipes 14 and 21. During the next intake stroke, when the plunger 2 moves downward, the excess quantity of fuel emulsion is first introduced through the pipe 24, 25 and the check valve 16 into the injection pump. The check valves 15 and 22 remain closed as long as the pressure in the accumulator 26 is higher than the pressure in the pipes 14 and 21 which is adjusted by means of the pressure control means 13 and 20. Only when the accumulator 26 has released its content and is without pressure, will the pressure generated by the pumps 6 and 7 be sufficient for overcoming these check valves, and fresh water or fresh fuel can then flow from the storage tanks 8 and 9 into the pump space.

Figure 2:
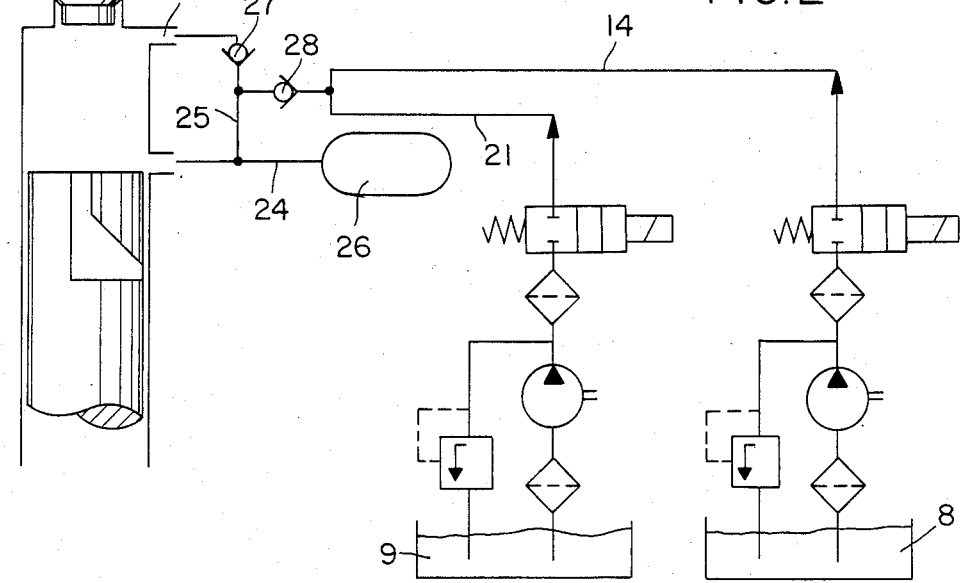
FIG. 2 is an injection pump where the feeding pipes for the water and the diesel fuel are combined with one another directly in front of the pump inlet.

FIG. 2 shows another embodiment similar to FIG. 1 in which one inflow opening 29 is sufficient. In this case, the supply pipe 14 for the diesel fuel and the supply pipe 21 for the water combine directly in front of the check valve 28 that, with respect to its function, corresponds to the check valve 15 in FIG. 1. The fuel emulsion flowing back from the accumulator 26, via the pipes 24 and 25, flows into a pipe leading out of both pipes 14 and 21 between the check valves 27 and 28. In its function, the check valve 27 corresponds to the check valve 16 from FIG. 1. Otherwise, the same symbols have the same functions as in FIG. 1. In the case of the embodiment according to FIG. 2, a check valve on pipe 21 corresponding to check valve 22 in FIG. 1 is therefore not necessary.

By means of the process according to the invention, the mixing of water and diesel fuel takes place in the injection pump which makes a very good formation of the emulsion possible. In addition, in each case, only very small quantities of emulsion exist so that when the mixing ratio is changed, the mixture with the new mixing ratio is available at the point of consumption (injection nozzle) very rapidly and without extensive idle times.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Process for producing a diesel-fuel/water emulsion for a diesel engine comprising:
   supplying different quantitative proportions of water and diesel fuel as a function of the operating condition of the engine, said supplying including leading said water and diesel fuel quantities separately to an intake side of an injection pump;
   mixing said quantitative proportions in a pump cylinder;
   storing temporarily a non-injected highly pressurized excess quantity of mixture in a constant volume accumulator; and
   providing said excess quantity to the injection pump during a subsequent intake stroke.

2. Process for producing a diesel-fuel/water emulsion for a diesel engine comprising:
   supplying different quantitative proportions of water and diesel fuel as a function of the operating condition of the engine, said supplying including leading said water and diesel fuel quantities separately to an intake side of an injection pump;
   mixing said quantitative proportions in a pump cylinder;
   storing temporarily a non-injected highly pressurized excess quantity of mixture in an accumulator, said accummulator being operated under a pressure that is higher than the pressure in supply systems for water and diesel fuel but lower than one of the pressure that is required for the opening of a pump flap valve on the high pressure side and the pressure that is required for the opening of an injection nozzle valve; and
   providing said excess quantity to the injection pump during a subsequent intake stroke.

3. A process according to claim 2, wherein the accumulator is operated under a pressure that is higher than the pressure in supply systems for water and diesel fuel but lower than the pressure that is required for the opening of an injection nozzle valve.

4. A process according to claim 2, wherein the different quantities of water and diesel fuel at a constant pressure are produced in water and fuel supply pipes in front of a pump by valve means having controlled screen openings.

5. A process according to claim 2, wherein the different quantities of water and diesel fuel at a constant pressure are produced in water and fuel supply pipes in front of a pump by a flow valve in the supply pipes having different opening times.

6. Process for producing a diesel-fuel/water emulsion for a diesel engine comprising:
supplying different quantitative proportions of water and diesel fuel as a function of the operating condition of the engine, said supplying including leading said water and diesel fuel quantities separately through supply means to an intake side of an injection pump;
mixing said quantitative proportions in a pump cylinder;
storing temporarily a non-injected highly pressurized excess quantity of mixture in an accumulator;
preventing said stored non-injected highly pressurized excess quantity of mixture in the accumulator from moving into said supply means by providing check valve means between the accumulator and the supply system; and
providing said excess quantity to the injection pump during a subsequent intake stroke.

7. Process as in claim 6, including communicating said mixture to a high pressure injection nozzle located downstream of the injection pump.

8. Process as in claim 6, wherein said storing includes operating an accumulator.

9. Process as in claim 6, wherein said mixing includes providing a pump valve means between the injection cylinder and injection nozzle, wherein said supplying of said excess quantity from the accumulator to the injection pump includes operating the accumulator at a pressure higher than pressure in the water and fuel supply systems, and lower than a pressure required for opening the pump valve means.

10. Apparatus for producing a fuel/water emulsion for an engine comprising:
supply system means for supplying proportioned quantities of water and fuel separately to an injection pump during an intake stroke of the injection pump;
mixing means for mixing said quantities in said pump;
communicating means for communicating said mixture to a high pressure injection nozzle located downstream of the injection pump;
storing means for storing an excess quantity of fuel/water emulsion and for supplying said excess quantity to the injection pump during a subsequent intake stroke;
pump valve means associated with said pump cylinder between said cylinder and the engine; and
check valve means between said supply system and said storing means.

11. Apparatus as in claim 10, including pump valve means associated with said pump cylinder between said cylinder and the engine and check valve means between said supply system and said storing means.

12. Apparatus as in claim 10, wherein said storing means includes an accumulator, said accumulator operating during an initial stage of the intake stroke of said pump at a pressure higher than the pressure in the water and diesel fuel supply systems, and lower than a pressure required for opening the pump valve means.

13. Process for producing a diesel-fuel/water emulsion for a diesel engine comprising:
supplying different quantitative proportions of water and diesel fuel as a function of the operating condition of the engine, said supplying including leading said water and diesel fuel quantities separately to an intake side of an injection pump;
mixing said quantitative proportions in a pump cylinder;
storing temporarily a non-injected highly pressurized excess quantity of mixture in an accumulator;
providing said excess quantity to the injection pump during a subsequent intake stroke such that said accumulator is emptied; and
subsequently supplying additional separate portions of water and diesel fuel quantities to the intake side of the injection pump.

14. Apparatus for producing a fuel/water emulsion for an engine comprising:
supply system means for supplying different quantitative proportions of water and diesel fuel separately to an injection pump cylinder as a function of the operating condition of the engine during an intake stroke of the injection pump;
mixing means for mixing said quantities in said pump cylinder;
constant volume accumulator storing means for storing temporarily a non-injected highly pressurized excess quantity of said mixture and for providing said excess quantity to the injection pump cylinder during a subsequent intake stroke.

15. Apparatus as in claim 14 further comprising communicating means for communicating said mixture to a high pressure injection nozzle located downstream of the injection pump.

* * * * *